Oct. 20, 1925.

C. F. WIRSCHING 1,558,070

PEANUT DIGGER

Filed May 25, 1923

Inventor:
Charles F. Wirsching
by his Attorney
John C. Firmin

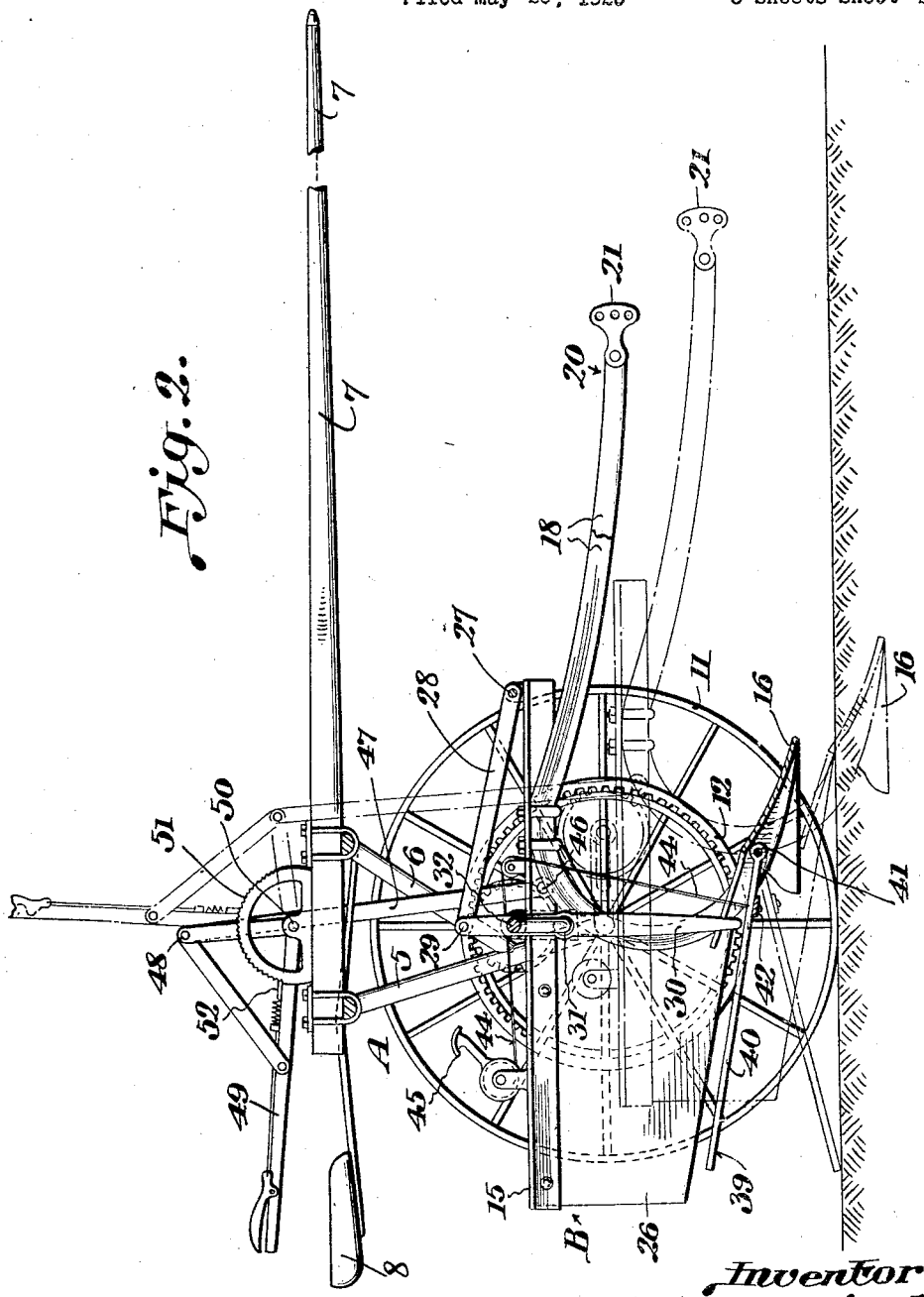

Oct. 20, 1925.   1,558,070
C. F. WIRSCHING
PEANUT DIGGER
Filed May 25, 1923   3 Sheets-Sheet 3
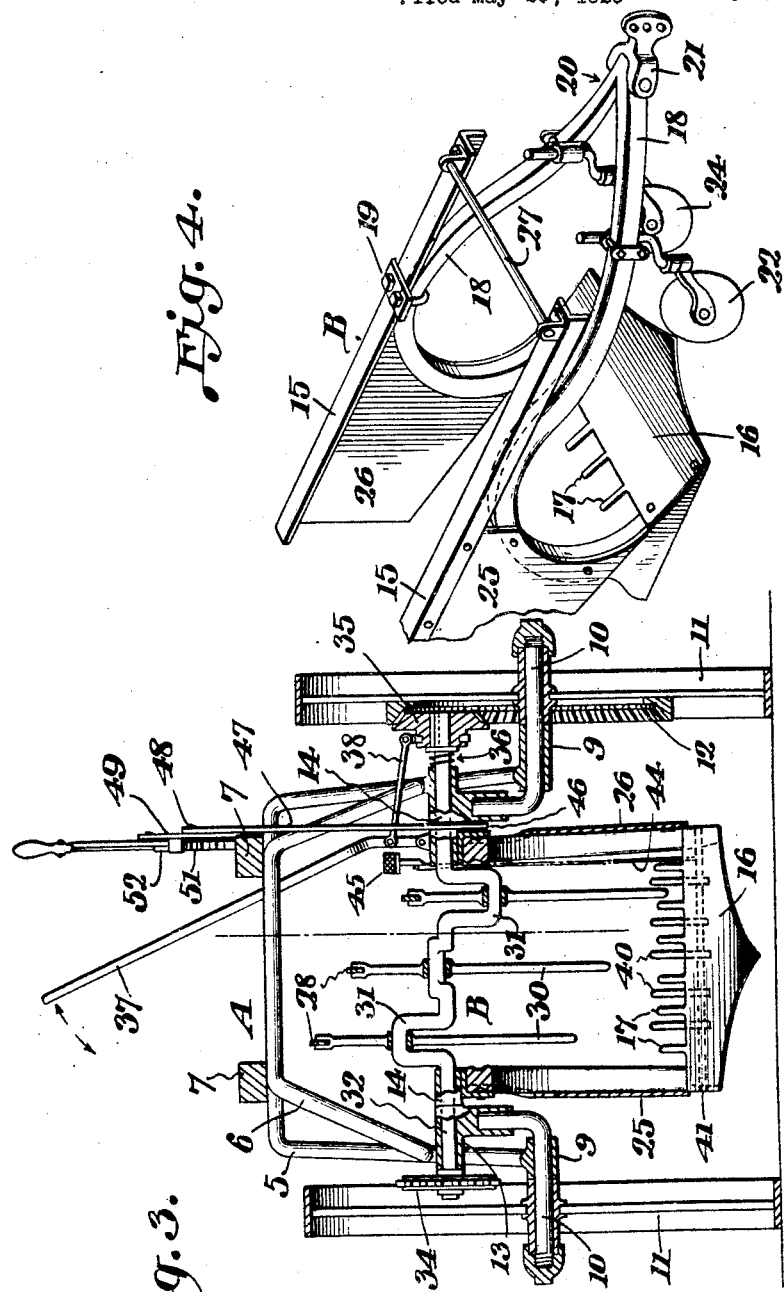
Inventor:
Charles F. Wirsching
by his Attorney Patented Oct. 20, 1925.

1,558,070

UNITED STATES PATENT OFFICE.

CHARLES F. WIRSCHING, OF WASHINGTON, DISTRICT OF COLUMBIA.

PEANUT DIGGER.

Application filed May 25, 1923. Serial No. 641,347.

*To all whom it may concern:*

Be it known that I, CHARLES F. WIRSCHING, a citizen of the United States, residing at Washington, in the District of Columbia, have invented certain new and useful Improvements in Peanut Diggers, of which the following is a specification.

My invention relates to improvements in peanut diggers and has for its object to provide a machine which will plow up the peanut plant, free it from the soil adhering to the roots, and deposit it on the surface of the ground in rear of the plow.

A further object is to provide a machine which will leave the goobers attached to the plant nodes so that the vines may be stacked and the goobers properly dried before picking.

A further object is to provide a means in a peanut digger whereby the vines after being plowed and freed from dirt may be evenly distributed along the ground or may be arranged in suitable piles at the will of the operator.

A further object is to provide a machine of peculiar construction which may readily be used to dig sweet potatoes or other root crops as well as peanuts by using the machine as a whole or in part as the nature of the particular crop demands.

With the above and other objects in view as may become apparent from the following disclosure, my invention consists in the novel combination of elements, construction and arrangement of parts, operation and specific features to be hereinafter enlarged upon and recited in the subjoined claims, my invention being illustrated in the accompanying drawings, wherein:—

Figure 2 is a similar view showing the tilting frame in raised and lowered positions.

Figure 3 is a transverse section, and

Figure 4 is a detail of the tilting frame and plow.

Figure 1:
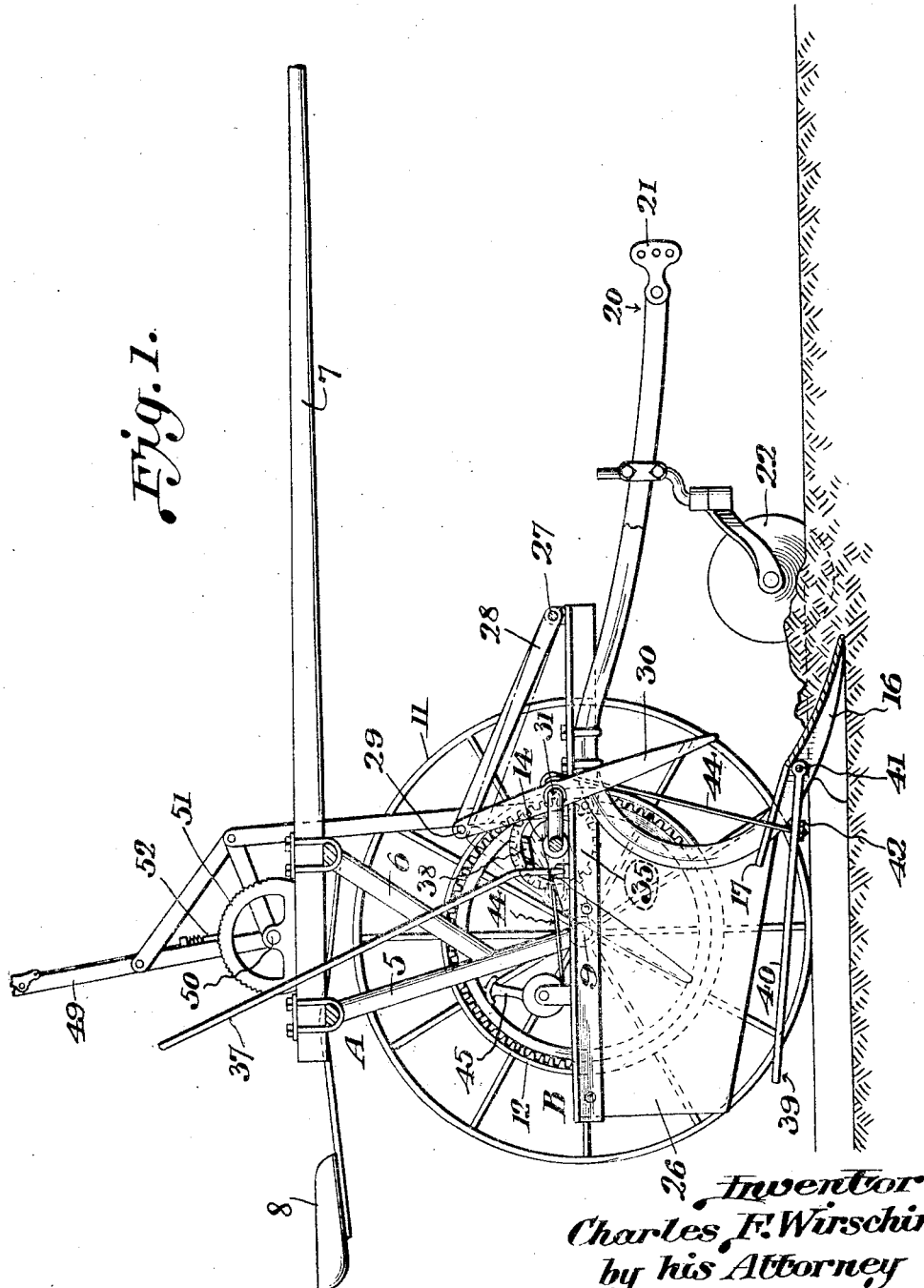
Figure 1 is a partial side section view of the complete device.

Referring to the drawings, the main frame A is of inverted U-shape with depending legs 5 and brace members 6 carrying a draft pole or shafts 7 and an operator's seat 8.

Suitably enlarged bearings 9 of the main frame form a support for stub axles 10 on the outer ends of which are mounted wheels 11 to one of which a bevel drive gear 12 is secured.

The inner ends of the stub axles are bent, and secured to the housings 13 through which the ends of the crank shaft 32 project. A second pair of housings 14 mounted on shaft 32 inwardly of housings 13 have secured to them a second frame B comprising spaced angle irons 15.

A suitable plow 16, which may have fingers 17, is secured to a double beam 18, attached to the angle irons at 19 and converging to a point 20 where is attached a clevis 21.

Rolling colters 22 and 24 are secured to the beams and may be adjusted toward or away from the plow to vary their width of cut.

Side guard plates 25 and 26 are bolted at their forward edges to the beams adjacent the plow and along their upper edges to the angle irons.

Secured to a bar 27 are reach-rods 28 attached at 29 to fingers 30 on the crank offsets 31 of the crank shaft 32.

This crank shaft is journalled in the housings 14, before mentioned, and has at one end thereof a sprocket gear 34 for driving a second crank shaft, fingers and reach rods (not shown) if the heavy growth of vine plowed by the machine makes this desirable.

On the other end of the crank shaft is slidably keyed a bevel gear 35, normally held in mesh with the large gear on the traction wheel by a spring 36. This gear may be thrown out of engagement by the lever 37 and its link 38.

A rack 39 comprising rearwardly extending fingers 40 is hinged at 41 adjacent the plow. A cross bar 42, attached to the fingers, is connected by a cable 44 to a foot pedal 45.

Attached at 46 to the second frame B is a link 47 secured at 48 to a bell-crank or similar lever 49 pivoted at 50 on the quadrant 51 and having a detent 52 in engagement therewith.

By mounting the sub-frame composed of the spaced angle irons 15 as illustrated upon the stub axles and having the manually controlled operating means attached in such a manner as to rock the same about the stub axles and in so far as the sub-frame carries the plow frame the plow point 16 may be elevated above the surface, the sub-frame being in the same parallel relation to the surface as when projected to cause the point to enter the ground. Thus the angle of inclination of the point remains the same regardless of the depth of cut. This is particularly of advantage in sandy loams where a peanut digger is employed.

In operation this machine is driven across a field to be dug with the wheels astraddle the row of vines. The colters may be adjusted the width of the plow to make a clean cut land side or they may be adjusted to cut narrower or wider than the plow by moving away from or toward the plow on the forwardly converging double beams. The lever 49 is now raised and pushed forward allowing the secondary frame to lower with respect to the main frame, it pivoting forward about the stub axle, until the desired depth of plow cut is reached whereupon it is locked in position by the quadrant and detent.

The traction wheel through its gear now drives the crank shaft and the plow fingers being held at their upper ends are caused to claw along the length of the rack.

As the earth and vines are plowed they pass back over the plow onto the rack, where the claw fingers gently sweep the vines away from the dirt and to the rear of the rack.

The rack may be raised to a position where the claw kickers sweep backward through and between the rack teeth or it may be lowered, its position relative to the kickers being directed at will by the operator, and being dependent upon the characteristics of the crop being dug.

If the operator's foot be now removed from the pedal the rack lowers and the vines are dumped in piles or strewn along the ground at will.

Used as a peanut digger, the colters may be dispensed with or not as preferred; while as a sweet potato digger they may be used to cut the vines ahead of the plow and on each side of the row.

As a sweet potato digger, the claw fingers or kickers may be dispensed with or thrown out of gear and the tines 17 on the plow may be removed. The sifting grate 39 may be removed at will, these changes being all at the will of the operator and determined by his experience in handling the various root crops with which my machine may be used.

While in the foregoing I have described specific embodiments, and have mentioned only certain possible modifications, it will be appreciated that in practice I do not limit myself to such specific details as herein set forth, but may resort to any practical modifications falling within the scope of the claims.

What I claim and desire to secure to me by Letters Patent of the United States, is:—

1. In a machine of the class described, a main frame, a pair of stub axles carried thereby, a wheel mounted upon each stub axle, a sub-frame pivotally connected to the stub axles interiorly of the main frame and adapted to swing thereabout to be raised or lowered, a plow frame detachably carried by the sub-frame, and manually operated means mounted upon the main frame and connected to the sub-frame whereby the sub-frame may be retained substantially parallel to the surface traversed.

2. A machine of the class described, a main frame, two stub axles connected to and supported from the main frame, supporting wheels mounted upon the stub axles, a sub-frame pivoted intermediate of its length and between the stub axles whereby the same may be raised or lowered by being swung upon the stub axles, a plow frame connected to the sub-frame, and manually controlled means for raising and lowering the sub-frame and consequently the plow frame and for maintaining the same in adjusted position.

3. In a machine of the class described, a main wheeled frame, a sub-frame pivotally connected to the main frame and adapted to lie at all times parallel to the surface traversed, manually controlled means for moving the sub-frame upon its pivot and for retaining the sub-frame parallel within limits, said means comprising a detent, lever and link, crank arms and crank operated claw fingers mounted on the sub-frame, and driving means between the sub-frame and the main frame for operating the crank at all heights of the sub-frame relative to the main frame.

4. In a peanut digger a wheeled main frame, a sub-frame pivotally connected to the main frame, a plow frame carried by the sub-frame, rearwardly extending fingers hinged to the plow beneath the moldboard, means comprising a detent lever and link connected to the main frame for rocking the sub-frame about its pivot and maintaining the sub-frame parallel to the surface traversed so that the plow will enter the ground at the same angle for all heights, and means carried by the sub-frame for adjustably maintaining the hinged fingers in relation to the sub-frame at all heights of the sub-frame and plow.

5. A peanut digger comprising a main frame, a pair of stub axles carried thereby, a wheel mounted on each stub axle, a crank shaft carried by the stub axles, a plow frame pivoted on the crank shaft and carrying a plow, crank operated claw fingers mounted on the plow frame, rearwardly extending fingers hinged to the plow beneath the moldboard, manually operated means to maintain the fingers in adjusted relation relative to the plow frame, and manually controlled means for raising and lowering the plow frame and plow, the crank, claw fingers, and hinged fingers, as a whole, and for maintaining the same in adjusted position.

In testimony whereof I affix my signature.

CHARLES F. WIRSCHING.